Oct. 7, 1969  L. G. MASONE  3,470,960
METHOD OF ATTACHING HORSESHOES
Filed Dec. 15, 1967

INVENTOR
L. GEORGE MASONE

BY *Sherman E. Galloway*
ATTORNEYS

United States Patent Office 3,470,960
Patented Oct. 7, 1969

3,470,960
METHOD OF ATTACHING HORSESHOES
Louis George Masone, Box 402, Lennox Hill Post Office,
New York, N.Y. 10021
Filed Dec. 15, 1967, Ser. No. 690,842
Int. Cl. A01l 3/02
U.S. Cl. 168—4       5 Claims

ABSTRACT OF THE DISCLOSURE

A method of attaching horseshoes to a horse's hooves with a thin layer of a resilient adhesive.

---

The present invention relates generally to an improved method of affixing horseshoes to a horse's hooves. More particularly, the invention relates to a method of attaching horseshoes to a horse's hooves by the use of a thin layer of a resilient adhesive whereby injury to said hooves is avoided.

One of the greatest hazards to a horse is the ever-present danger of an injury to its legs as a result of the constant pounding of the hooves against the ground. This pounding may weaken the legs of a horse to such an extent that its activity must be restrained for treatment. Wild horses have travelled over burning sands and rocky terrain on sound feet and legs for years without veterinary assistance, yet the useful life of many hundreds of valuable domestic and racing horses ends prematurely each year from foot and leg trouble. In many instances it is believed that foot and leg injuries are traceable to improper shoeing. Furthermore, horses are also injured as a result of repeated shoeing with conventional fastening methods, i.e., nails. This repeated nailing of the shoes to the hooves can resule in a splitting of the hooves.

The affixing of horseshoes to a hoof by the use of a glue has been suggested by workers in this field. However, the prior suggested methods of affixing the horseshoes with glue have not been found satisfactory because the glues utilized heretofore have been either irritating to the hooves or did not adequately bond the shoes to the hooves for a period of time which is long enough to be considered commercially functional. Moreover, suggested prior art methods of cushioning a horse's hooves are not found to be adequate because while they cushion the vertical forces produced by the pounding of the hooves, they also introduce into the movement a transverse slippage which introduces another risk of injury to the horse's legs. It has now been found that the disadvantages of the prior art can be overcome by affixing the horseshoe to the horse with a resilient adhesive.

Accordingly, the principal object of the invention is to provide a method of affixing horseshoes to horses' hooves which overcomes the disadvantages of the prior art.

Another object of the present invention is to provide a method of affixing horseshoes to horses' hooves without the use of nails, said method also providing a cushion for the constant concussion of the hooves against the ground.

A further object of this invention is to provide a method of affixing horseshoes to horses' hooves with a resilient adhesive which in addition to bonding said horseshoes to said hooves, will provide a cushioning effect for said hooves against the constant concussion of the hooves against the ground.

These and other objects of the invention will be apparent to those skilled in the art from the following more detailed description, in conjunction with the drawings wherein like numerals refer to like parts throughout, and in which.

Figure 1:
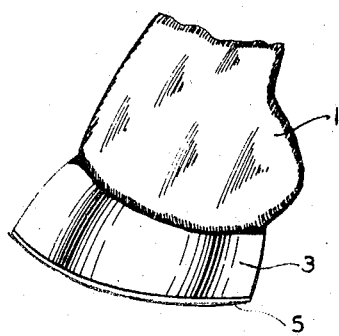
FIGURE 1 is a perspective view of a horse's hoof with a thin adhesive layer.

Specifically, in FIGURE 1, numeral 1 represents a horse's leg wherein the hoof 3 is coated with a thin layer of a resilient adhesive 5 which will both bond a horseshoe and cushion the hoof.

Figure 2:
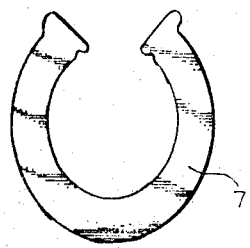
FIGURE 2 is a perspective view of a conventional horseshoe.

FIGURE 2 represents any of the conventional horseshoes 7 which can be attached to the horse's hooves in accordance with the method of the present invention.

Figure 3:
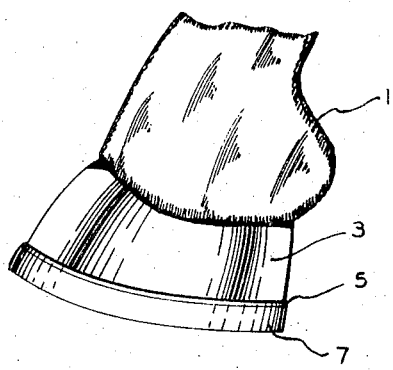
FIGURE 3 is a perspective view of a horse's hoof with a shoe affixed thereto by means of a thin layer of a resilient adhesive.

FIGURE 3 illustrates a horse's leg 1 wherein the horse's hoof 3 has been coated with a thin layer, approximately one-eighth of an inch in thickness, of a resilient adhesive 5 to which a conventional horseshoe 7 has been securely affixed.

The adhesive layer 5 comprises a resilient adhesive which can be a rubbery polymer, a polysiloxane, an epoxy resin, a gum, a polyurethane resin, a polycarbonate or any other adhesive which will result in a cushioning bond between the horse's hooves and the horseshoes.

The preferred resilient adhesive is a rubbery polymeric adhesive comprising at least one conjugated diene, a polymerizible vinyl compound and an ethylenically unsaturated monocarboxylic acid. The conjugated diene can be a chloro-diene, chloroprene, isoprene, or butadiene. The polymerizible vinyl compound can be acrylonitrile, styrene, or esters of acrylic and methacrylic acid. The esters of acrylic and methacrylic acid can be formed from aliphatic alcohols containing one to ten carbon atoms. The ethylenically unsaturated monocarboxylic acid can be sorbic acid, acrylic acid, methacrylic acid, or cinnamic acid.

The preferred resilient adhesive composition is one comprising:

|  | Percent |
|---|---|
| Butadiene | 70–80 |
| Acrylonitrile | 1–30 |
| Methacrylic acid | 1–10 |

The conventional horseshoes 7 employed in conjunction with this invention can be any of those which have been used with other standard methods of shoeing horses. Said shoes can be made of aluminum, steel, plastic, fiberglass, cork, rubber, or any other conventional material used to make horseshoes.

The method of the present invention comprises the steps of applying the resilient adhesive in a thin layer of from about one-sixteenth to about one-half of an inch in thickness of adhesive. The thickness of the adhesive is critical to the successful operation of the present invention inasmuch as the thin layer of adhesive eliminates the transverse slipping which has occurred with the prior art methods of cushioning a horse's hooves. The thin layer of adhesive is preferably one-eighth of an inch in thickness which is adequate to provide a strong, durable, and long-lasting bond, and provide a cushion which is adequate to protect the hooves from concussion. When the layer of adhesive has become tacky, the horseshoe is then affixed to said tacky layer of adhesive, with a secure bond of the horseshoe to the hoof resulting.

The following examples are illustrative of the various aspects of the invention and are not intended to limit the invention to the exact composition or steps employed.

EXAMPLE I

The hoof of an unshod horse was cleaned by scraping and trimmed. A shoe made of plastic was fitted to the horse's hoof in a conventional manner. A thin layer of an adhesive comprising

|  | Percent |
|---|---|
| Butadiene | 73 |
| Acrylonitrile | 20 |
| Methacrylic acid | 7 | was applied by means of a brush until a layer one-eighth of an inch in thickness was deposited on the hoof. The adhesive was allowed to dry until tacky and the plastic horseshoe was then affixed thereto. The horseshoe was allowed to set until the adhesive had thoroughly dried. The process was repeated for the horse's three other legs. The resulting bond was then tested and found to be strong and durable, providing a cushioning effect without any transverse slippage for the horse's hooves.

EXAMPLE II

The steps of Example I were followed using an adhesive comprising

|  | Percent |
|---|---|
| Isoprene | 75 |
| Acrylonitrile | 20 |
| Methacrylic acid | 5 | which was applied until a layer one-half of an inch in thickness resulted.

The resulting bond was both strong and durable, and the bond provided a cushioning effect without any transverse slippage for the horse's hooves.

EXAMPLE III

The hoof of an unshod horse was cleaned by scraping and trimmed. A shoe made of steel was fitted to the horse's hoof in a conventional manner. An adhesive comprising

|  | Percent |
|---|---|
| Chloroprene | 75 |
| Acrylonitrile | 20 |
| Methacrylic acid | 5 | was applied to the shoe until a layer one-sixteenth of an inch in thickness was deposited. The adhesive was allowed to dry until tacky and the shoe was then affixed to the horse's hoof. The adhesive was allowed to dry and the resulting bond was tested and found to be both strong and durable, and said bond provided a cushioning effect without any transverse slippage for the horse's hooves.

While the adhesive in the illustrations has been applied by brushing, the invention also encompasses the application of the adhesive to either the shoe or the hoof by other conventional means such as spraying and dipping. The above examples are illustrations of the preferred embodiment of the invention and are intended as illustrations and are not intended to in any way limit the invention.

Having adequately described the present invention what is desired to be protected by Letters Patent is:

1. A method of fastening horseshoes to a horse's hooves which comprises applying to the horse's hooves a thin layer of a resilient adhesive, said layer being from about $1/16$ of an inch to about $1/2$ of an inch, said adhesive comprising a polymeric adhesive which comprises a conjugated diene, a polymerizable vinyl compound, and an ethylenically unsaturated monocarboxylic acid designed to cushion said horse's hooves and subsequently affixing horse's shoes thereto.

2. The method of claim 1 wherein said vinyl compound is selected from the group comprising acrylonitrile, styrene, and esters of acrylic and methacrylic acid.

3. The method of claim 1 wherein said conjugated diene is selected from the group comprising a butadiene and conjugated chloro dienes.

4. The method of claim 1 wherein said thin layer is $1/8$ of an inch in thickness.

5. The method of claim 1 wherein said resilient adhesive comprises a polymer of butadiene, acrylonitrile, and methacrylic acid.

References Cited

UNITED STATES PATENTS

| 2,395,017 | 2/1946 | Semon | 260—80.7 |
| 2,872,366 | 2/1959 | Kiernan et al. | 260—80.7 X |
| 2,880,189 | 3/1959 | Miller et al. | 260—80.7 X |
| 3,050,133 | 8/1962 | Ketner et al. | 168—4 |
| 3,200,885 | 8/1965 | Johnson | 168—12 |
| 3,302,723 | 2/1967 | Renkenberger et al. | 168—4 |

OTHER REFERENCES

Skeist: Handbook of Adhesives, 1962, pp. 230, 256 and 257.

HUGH R. CHAMBLEE, Primary Examiner